US007565236B2

(12) United States Patent
Turin et al.

(10) Patent No.: US 7,565,236 B2
(45) Date of Patent: Jul. 21, 2009

(54) AIRFLOW ESTIMATION METHOD AND APPARATUS FOR INTERNAL COMBUSTION ENGINE

(75) Inventors: Raymond Claude Turin, Grosse Pointe Park, MI (US); Rong Zhang, Troy, MI (US); Man-Feng Chang, Troy, MI (US)

(73) Assignee: GM Global Technology Operations, Inc., Detroit, MI (US)

(*) Notice: Subject to any disclaimer, the term of this patent is extended or adjusted under 35 U.S.C. 154(b) by 191 days.

(21) Appl. No.: 11/780,508

(22) Filed: Jul. 20, 2007

(65) Prior Publication Data

US 2009/0024300 A1 Jan. 22, 2009

(51) Int. Cl.
*G06F 19/00* (2006.01)
*G01M 19/00* (2006.01)

(52) U.S. Cl. .................... 701/103; 701/115; 73/114.32; 73/114.33

(58) Field of Classification Search ......... 701/101–103, 701/110, 111, 115; 73/114.31–114.35; 702/50; 123/479, 480, 494
See application file for complete search history.

(56) References Cited

U.S. PATENT DOCUMENTS 5,714,683 A 2/1998 Maloney
5,753,805 A 5/1998 Maloney
5,845,627 A 12/1998 Olin
6,016,460 A 1/2000 Olin
6,651,492 B2 * 11/2003 Kolmanovsky et al. .. 73/114.37
6,820,589 B2 * 11/2004 Okubo et al. .......... 123/339.19
6,851,304 B2 * 2/2005 Cullen et al. ............ 73/114.32
2005/0229884 A1 * 10/2005 Kunz et al. .............. 123/90.17
2006/0054134 A1 * 3/2006 Henn et al. ................. 123/325

OTHER PUBLICATIONS

R. C. Turin and H. P. Geering, “On-Line Identification of Air-Fuel Dynamics in a Sequentially Injected SI Engine”, SAE 930857, Mar. 1993.

* cited by examiner

*Primary Examiner*—Willis R Wolfe, Jr.

(57) ABSTRACT

A method of estimating an air charge in at least one combustion cylinder of an internal combustion engine includes calculating cylinder mass air flow based upon a modified volumetric efficiency parameter; and calculating the intake throttle mass air flow based upon a throttle air flow discharge parameter and a fuel enrichment factor. Three models including a mean-value cylinder flow model, a manifold dynamics model, and a throttle flow model are provided to estimate the air charge in the at least one combustion cylinder and to control delivery of fuel to the fuel delivery system.

19 Claims, 4 Drawing Sheets

AIRFLOW ESTIMATION METHOD AND APPARATUS FOR INTERNAL COMBUSTION ENGINE

TECHNICAL FIELD

The present invention is related to the field of engine controls for internal combustion engines and more particularly is directed toward estimation of throttle mass air flow as used in such controls.

BACKGROUND OF THE INVENTION

The basic objective for fuel metering in most gasoline engine applications is to track the amount of air in the cylinder with a predefined stoichiometric ratio. Therefore, precise air charge assessment is a critical precondition for any viable open loop fuel control policy in such engine applications. As the air charge cannot be measured directly its assessment, in one way or another, depends on sensing information involving a pressure sensor for the intake manifold, a mass air flow sensor upstream of the throttle plate, or both. The choice of a particular sensor configuration reflects a compromise between ultimate system cost and minimum performance requirements. Currently, high cost solutions involving both sensors are found in markets with stringent emission standards while low cost solutions, mostly involving just a pressure sensor, are targeting less demanding developing markets.

Speed-density methods of computing the mass airflow at the engine intake are known in the art. However, employing the speed-density methods in conjunction with more complex engine applications such as cam-phasing and/or variable valve lift capability has not been practical or economically feasible.

Therefore, what is needed is a method for providing a low cost air charge estimator without the use of a mass air flow sensor that provides cylinder air estimation to satisfy developing market needs.

SUMMARY OF THE INVENTION

An internal combustion engine system includes a controller in signal communication with the engine and with a fuel delivery system, a combustion cylinder and piston reciprocating therein, an intake manifold directing flow of air into the at least one combustion cylinder, and an air throttle having a throttle orifice directing flow of air mass into the intake manifold. A method of estimating an air charge in at least one combustion cylinder of the engine includes: calculating cylinder mass air flow based upon a modified volumetric efficiency parameter; calculating the intake throttle mass air flow based upon a throttle air flow discharge parameter and a fuel enrichment factor; and using the cylinder mass air flow and throttle mass air flow to estimate the air charge within the at least one combustion cylinder. Three models including a mean-value cylinder flow model, a manifold dynamics model, and a throttle flow model are provided to estimate the air charge in the at least one combustion cylinder and to control delivery of fuel to the fuel delivery system.

BRIEF DESCRIPTION OF THE DRAWINGS

The invention may take physical form in certain parts and arrangement of parts, the preferred embodiment of which will be described in detail and illustrated in the drawings incorporated hereinafter, wherein.

DESCRIPTION OF THE PREFERRED EMBODIMENT

Figure 1:
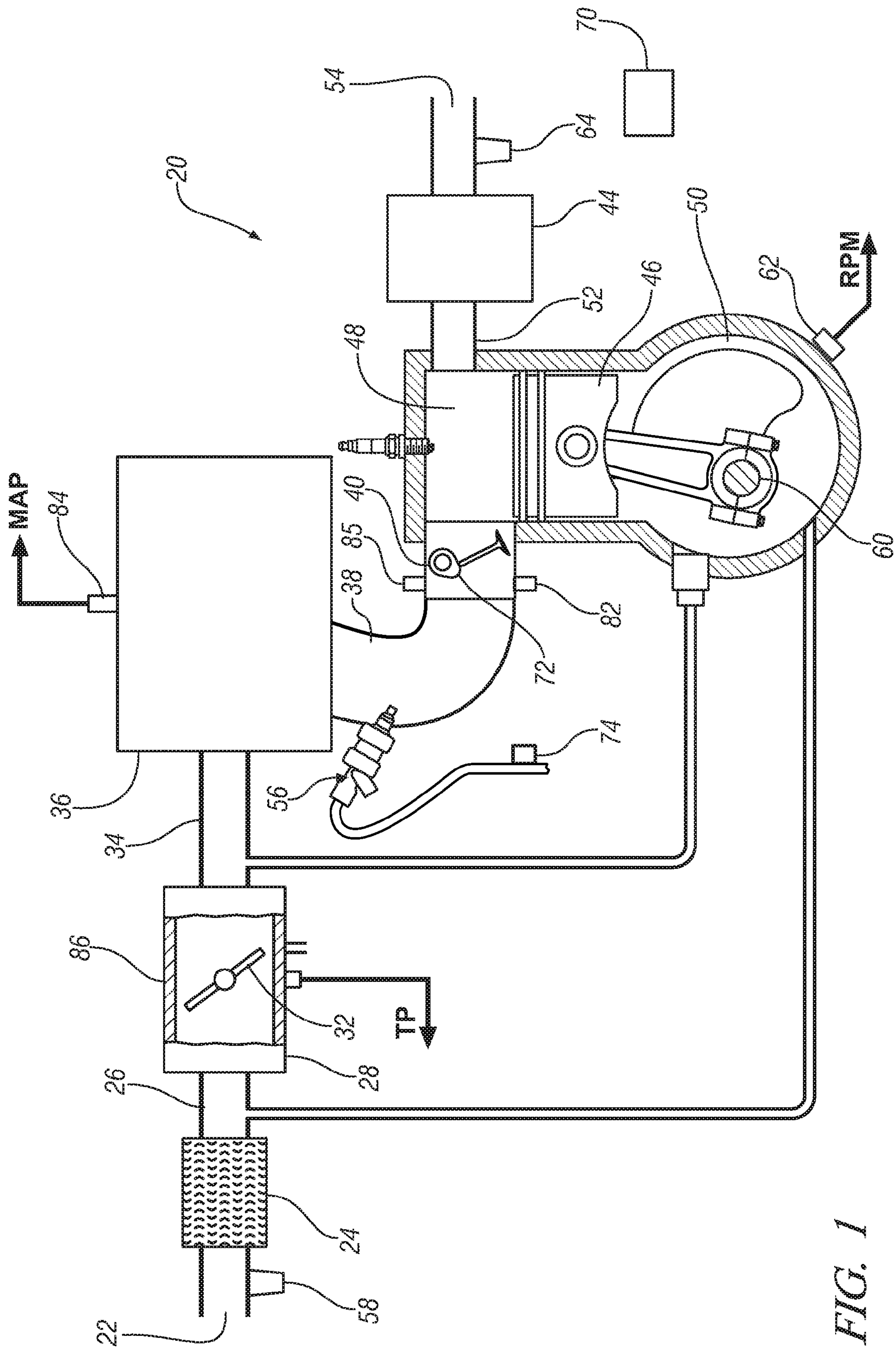
FIG. 1 is a schematic model of a spark ignited internal combustion engine system.

Turning now to FIG. 1, a schematic model of a spark ignited internal combustion engine system (System) 20 is illustrated. The System 20, in the most general sense, comprises all engine associated apparatus affecting or affected by gas mass flow and includes the operating environment or atmosphere from which and to which gas mass flows. The internal combustion engine includes a naturally aspirated or a boosted internal combustion engine. The atmosphere 66 is shown entering the system at the fresh air inlet 22.

The System includes a variety of pneumatic elements, each generally characterized by at least a pair of ports through which gas mass flows. For example, air induction including fresh air inlet 22, air cleaner 24, and intake duct 26 is a first general pneumatic element having ports generally corresponding to the air inlet 22 at one end and another port generally corresponding to the intake duct 26 at the other end. Another example of a pneumatic element is intake manifold 36 having ports interfacing with intake duct 34 and intake runner 38. Other general examples of pneumatic elements in the System include: intake air throttle orifice 86 including throttle body 28 and throttle plate 32; crankcase 50; combustion cylinder 46 including combustion chamber 48 and intake valve 40 and cam 72; exhaust including exhaust duct 52, and exhaust outlet 54.

The various elements shown in FIG. 1 are exemplary and the present invention is by no means restricted only to those specifically called out. Generally, an element in accordance with the present invention may take the form of a simple conduit or orifice (e.g. exhaust), variable geometry valve (e.g. throttle orifice) 86, pressure regulator valve (e.g. PCV valve), major volumes (e.g. intake and exhaust manifolds) 36,44, or pneumatic pump (e.g. combustion cylinder) 46.

In illustration of the interrelatedness of the various elements and flow paths in the internal combustion engine system 20, a gas mass (gas) at atmospheric pressure enters through fresh air inlet 22, passing an intake air temperature sensor 58, and then passing through air cleaner 24. Gas flows from intake duct 26 through throttle body 28. For a given engine speed, the position of throttle plate 32, as detected by a throttle position sensor 30, is one parameter determining the amount of gas ingested through the throttle body and into the intake duct 34. From intake duct 34, gas enters an intake manifold 36, whereat individual intake runners 38 route gas into individual combustion cylinders 46. Gas is drawn through cam actuated intake valve 40 into combustion cylinder 46 during piston downstroke and exhausted therefrom through exhaust runner 42 during piston upstroke. These intake and exhaust events are of course separated by compression and combustion events in full four-cycle operation, causing rotation of a crankshaft 60, creating an engine speed that is detected by an engine speed sensor 62. Gas continues through exhaust manifold 44, past the exhaust temperature sensor 64, and finally through exhaust outlet 54 to atmosphere 66.

In one embodiment of the invention, fuel 68 is mixed with the gas by a fuel injector 56 as the gas passes through individual intake runners 38. In other embodiments of the invention, fuel 68 may be mixed with the gas at other points.

In accordance with an embodiment of the invention, various relatively substantial volumetric regions of the internal combustion engine system are designated as pneumatic volume nodes at which respective pneumatic states are desirably estimated. The pneumatic states are utilized in determination of gas mass flows that are of particular interest in the control functions of an internal combustion engine. For example, mass airflow through the intake system is desirably known for development of appropriate fueling commands by well known fueling controls.

In accordance with an embodiment of the invention, the system may include a coolant temperature sensor 70 for sensing the temperature of the coolant.

In accordance with an embodiment of the invention including variable cam phasing, the angular positioning of the cam 72 providing the actuation of the cam actuated intake valve 40 may be determined by a cam position sensor 85.

In another embodiment of the invention including variable cam lifting, the amount of lift provided by the cam 72 providing the actuation of the cam actuated intake valve 40 may be determined by a variable cam lift position sensor 82.

Figure 2:
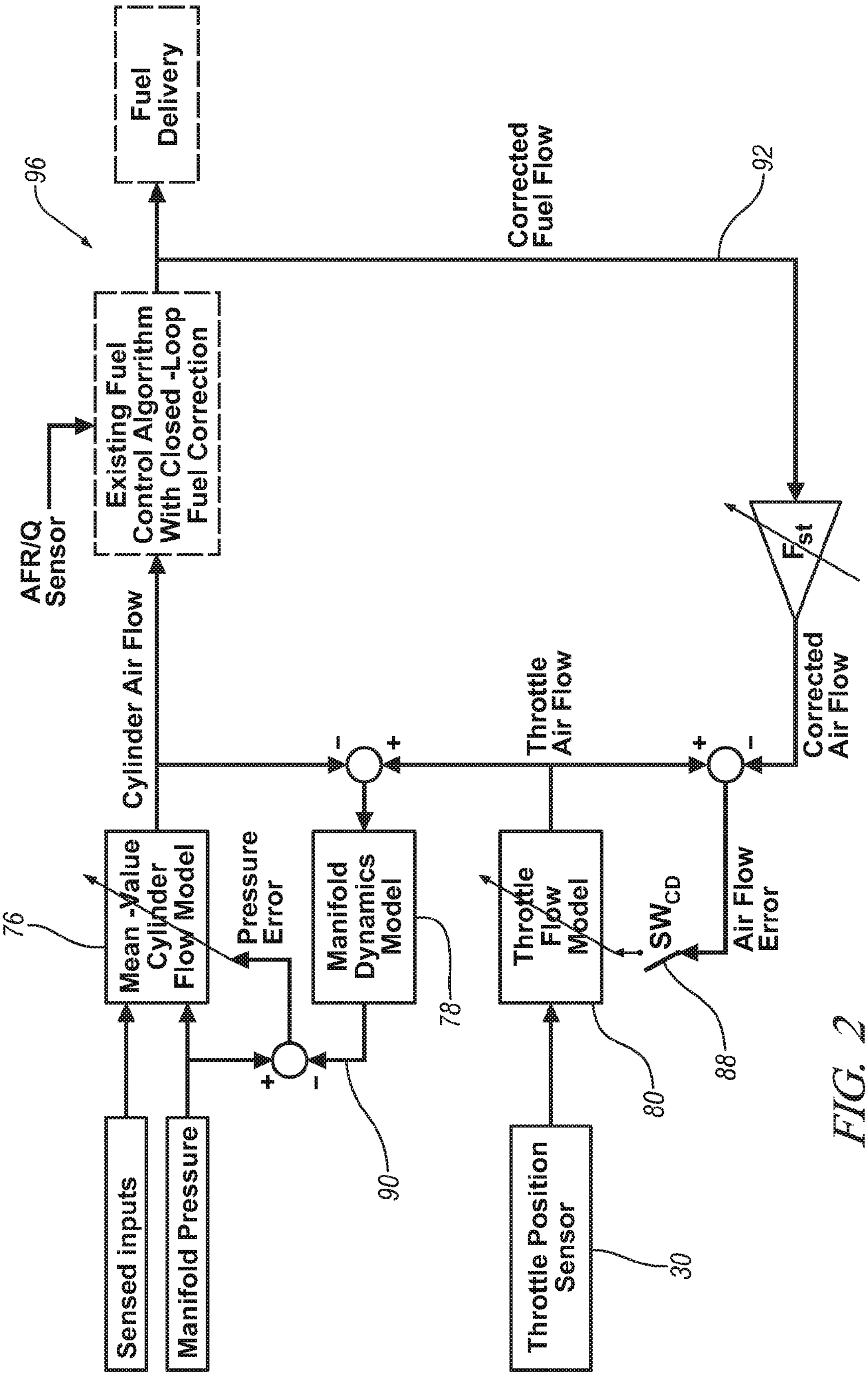
FIG. 2 illustrates a method of estimating cylinder air charge without a mass air flow sensor.

Turning now to FIG. 2, a method of estimating cylinder air charge without a mass air flow sensor 96 in accordance with an embodiment of the invention is illustrated. FIG. 2 shows a block diagram of a mean-value cylinder flow model 76, a manifold dynamics model 78, and a throttle flow model 80.

A method of cylinder air charge estimation for internal combustion engines without using a mass air flow (MAF) sensor 96, which satisfies the need of low cost engine control systems for markets with moderate emission standards is provided. The method estimates the cylinder air charge using a speed-density approach. The approach includes physics based models for the intake manifold dynamics and the air mass flow through the throttle orifice 86, and involves adaptive schemes to adjust the throttle air flow discharge parameter and the volumetric efficiency parameter. The method is applicable to engines with variable valve timing and/or variable valve lift. The method also adjusts for variations of fuel properties.

The method does not require a mass air flow sensor (MAF) and does not directly use the measurement of an oxygen sensor (O2) or a wide-range air-fuel ratio sensor (WAFR). However, a closed-loop fuel control algorithm known in the art that corrects the fuel injection amount based on O2 or WAFR measurements is used.

Figure 4:
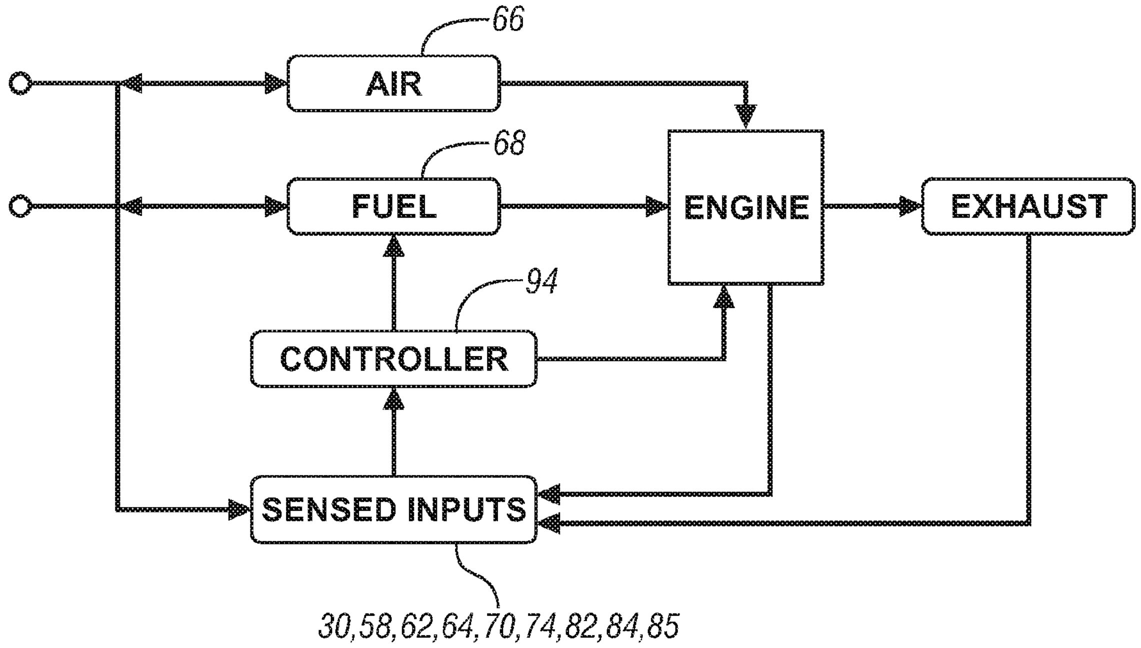
FIG. 4 is a block diagram showing the flow of the signals produced in the spark ignited internal combustion engine system shown in FIG. 1.

A mean-value model that models the manifold pressure dynamics and the gas flow through the throttle orifice 86 is shown in FIG. 2. Nominal static models for the volumetric efficiency coefficient of the engine ($\eta_{eff}$) and for the throttle discharge coefficient ($C_d$) are corrected with correction factors that are adjusted by a controller 94, as shown in FIG. 4.

The update of the volumetric efficiency correction is performed through methods known in the art. In one embodiment of the invention, a Kalman filter which uses the difference between the measured and modeled manifold pressure as an error metric may be used.

Figure 5:
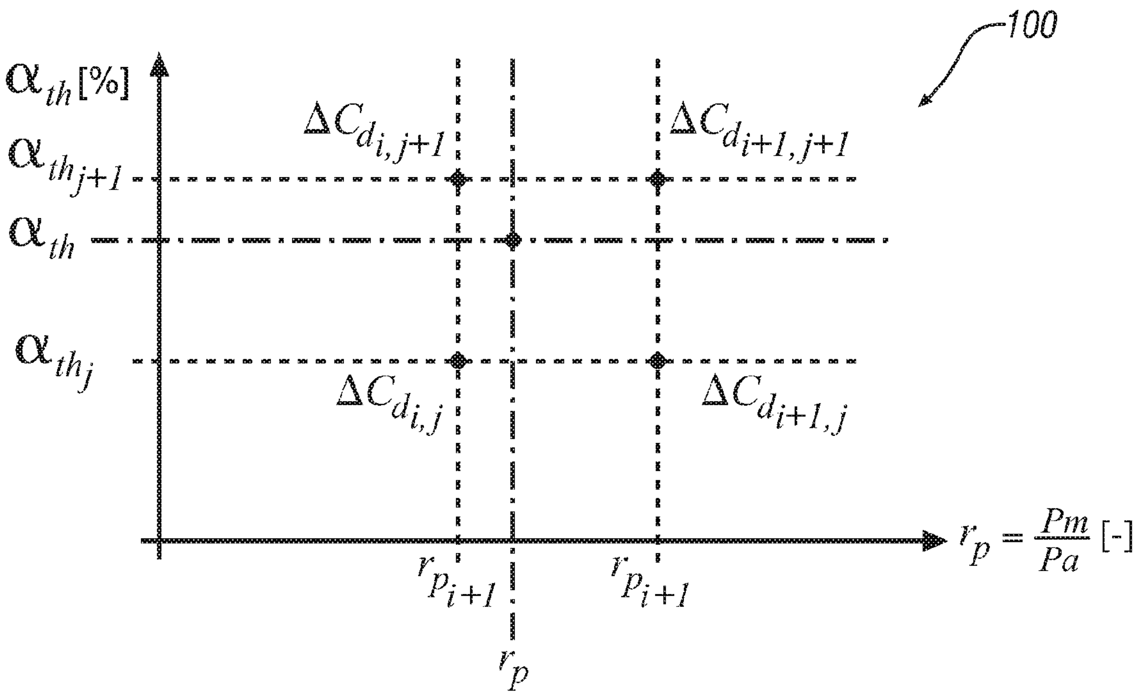
FIG. 5 is a correction look-up table used to determine the correction of the throttle discharge coefficient.

Correction of the throttle discharge coefficient is made using a correction look-up table 100, illustrated in FIG. 5. The correction look-up table 100 evolves as a function of the operating condition and is based on an air flow estimation error metric that is derived from the stoichiometric offset of a closed-loop fuel factor.

FIG. 2 is a flow diagram of cylinder air estimation without a mass air flow sensor. FIG. 2 shows a block flow diagram representing three physical models, including a mean-value cylinder flow model 76, a manifold dynamics model 78, and a throttle flow model 80. By measuring common engine signals except the mass air flow, the system uses the three physical models, two adaptation loops 90, 92 modifying volumetric efficiency and throttle air flow efficiency, and information from a known production closed-loop air to fuel ratio control algorithm, to calculate the cylinder mass air flow and the throttle mass air flow.

The invention requires common engine measurement inputs that include: throttle position sensor 30, manifold air pressure sensor (MAP) 84, engine speed sensor (RPM) 62, barometric sensor or key-on barometric reading of MAP sensor 84, variable cam phaser position (intake and exhaust) if applicable 85, variable cam lift position 82 (intake and exhaust) if applicable, intake air temperature sensor (IAT) 58, coolant temperature sensor 70, and exhaust temperature sensor 64.

Figure 3:
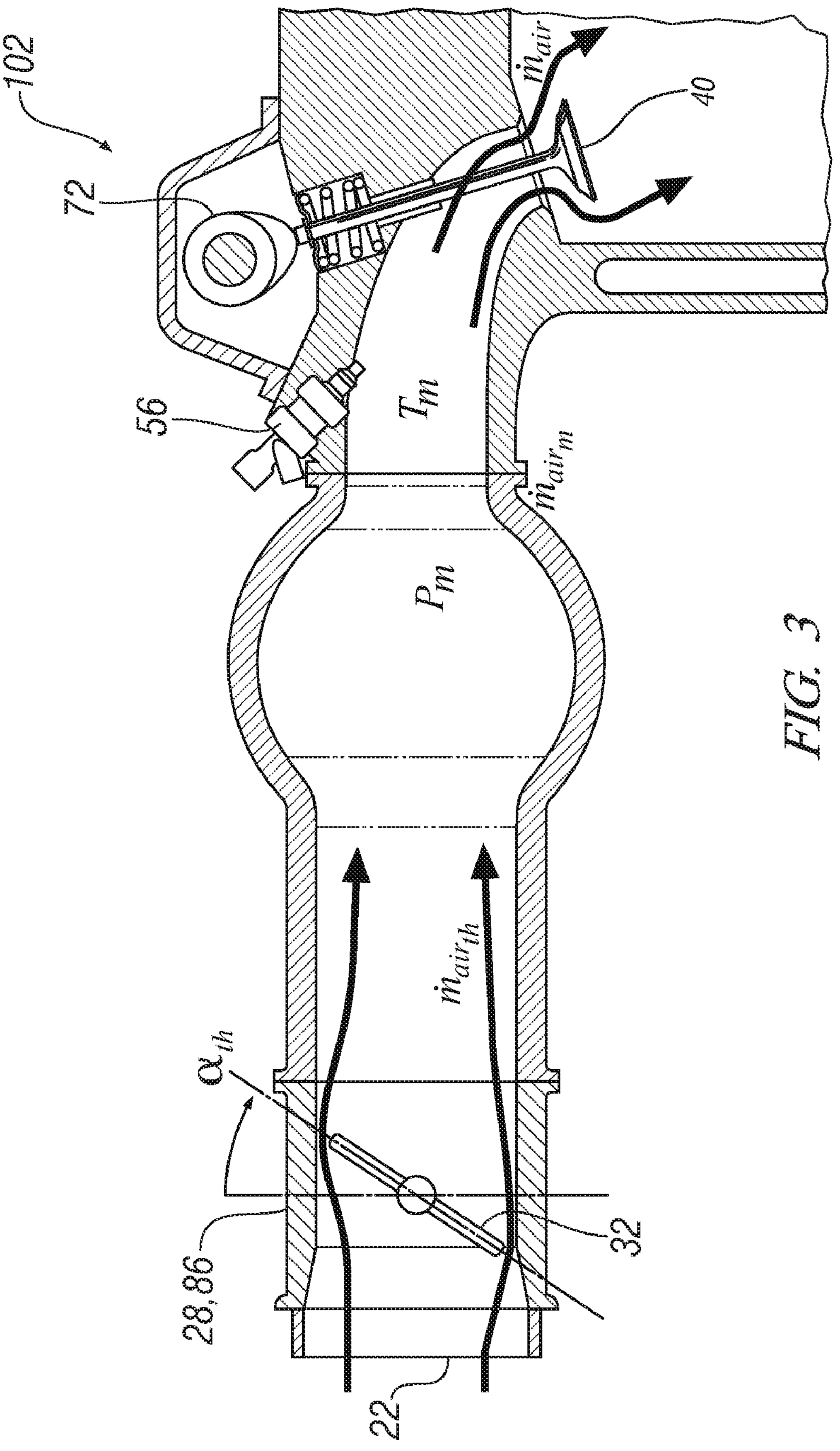
FIG. 3 is an illustration of the flow of air from atmosphere to a cylinder within the combustion engine system shown in FIG. 1.

FIG. 3 illustrates the flow of air 102 through the throttle orifice 86 and the intake manifold 36 as the air moves from atmosphere to the cylinder 46.

FIG. 4 generally illustrates the flow of the signals 98 produced by the preceding elements and shows the interrelatedness of the various components by depicting the information exchanged between them.

The manifold dynamics model 78 uses both the mean-value cylinder air flow and the throttle air flow to determine manifold pressure error. The throttle air flow is determined by the throttle flow model 80. The accuracy of the throttle flow model 80 is improved by correcting the throttle discharge coefficient through use of fuel correction information derived from air to fuel ratio close-loop fuel control algorithms known in the art. The correction of the throttle discharge coefficient defines the second adaptation loop 92.

Transient effects of gas mass stored in a substantial volume in a pneumatic capacitance element, such as an intake manifold 36, are generally modeled in the present invention in accordance with the net gas mass in the fixed volume of such pneumatic capacitance element. At any given instant, the finite gas mass $M_{net}$ contained in the pneumatic capacitance element of interest may be expressed in terms of the well known ideal gas law:

$$PV=M_{net}RT \tag{1}$$

where P is the average pressure in the volume, V is the volume of the pneumatic capacitance element, R is the universal gas constant for air, and T is the average temperature of the gas in the volume. The manifold pressure is related to the manifold mass ($m_m$) through the gas equation (1):

$$m_m = \frac{p_m V_m}{R T_m} \tag{2}$$

Differentiation of equation (2) with respect to time yields mean-value mass conservation defining a difference between the air mass flow through the throttle and into the manifold ($\dot{m}_{air_{th}}$) the air mass flow out of the manifold and into the cylinder ($\dot{m}_{air_c}$) for the manifold volume $V_m$:

$$\frac{d}{dt}m_m = \dot{m}_{air_{th}} - \dot{m}_{air_c} \tag{3}$$

Hence substituting equation (2) into equation (3) yields the relationship between the manifold mass flow ($m_m$) and pressure rate of change $\dot{p}_m$:

$$\begin{aligned}\frac{d}{dt}\left(\frac{p_m V_m}{RT_m}\right) &= \dot{p}_m \frac{V_m}{RT_m} - \dot{T}_m \frac{p_m V_m}{RT_m^2} \\ &= \dot{p}_m \frac{V_m}{RT_m} - \frac{m_m \dot{T}_m}{T_m} \\ &= \dot{m}_{air_{th}} - \dot{m}_{air_c}\end{aligned} \tag{4}$$

The principle of energy balance applied to the intake manifold volume yields:

$$\begin{aligned}\frac{d}{dt}(m_m c_v T_m) &= \frac{d}{dt}m_m c_v T_m + m_m c_v \dot{T}_m \\ &= \dot{m}_{air_{th}} c_p T_{th} - \dot{m}_{air_c} c_p T_m\end{aligned} \tag{5}$$

wherein $C_v$ and $C_p$ are the isochoric and isobaric heat capacities for air, and $T_{th}$ is the gas temperature at the throttle orifice. Combining (2) and (5) yields equation (6):

$$\dot{T}_m m_m = \dot{m}_{air_{th}}(\kappa T_{th} - T_m) - \dot{m}_{air_c}(\kappa - 1)T_m \tag{6}$$

Substituting equation (6) into equation (4) defines the manifold pressure rate of change $\dot{p}_m$:

$$\dot{p}_m = \frac{R\kappa}{V_m}(\dot{m}_{air_{th}} T_{th} - \dot{m}_{air_c} T_m) \tag{7}$$

The mean-value cylinder flow model 76 includes the calculation of a nominal volumetric efficiency $\eta_{eff}$ using the measured inputs. The mean-value cylinder flow model also includes a volumetric efficiency correction based on the difference between the estimated manifold pressure (as obtained from the manifold dynamics model) 78 and the measured manifold pressure, obtained from measurements made by the MAP sensor 84. The volumetric efficiency correction is made using a first adaptation loop.

Volumetric efficiency is corrected through the use of a manifold pressure error metric determined from a difference in actual measured manifold pressure and estimated manifold pressure and is input into the mean-value cylinder flow model 76.

The mean-value cylinder flow is the average mass air flow rate out of the intake manifold 36 into all the cylinders 46 and is derived from the cylinder air charge. The accumulated cylinder air charge per cycle ($m_{air_c}$) is a function of the pressure and the temperature conditions across the intake valve 40 during the time between intake valve opening (IVO) and intake valve closing (IVC). More specifically, accumulated cylinder air charge per cycle ($m_{air_c}$) may be expressed as follows:

$$m_{air_c} = \eta_{eff}\frac{p_m V_d}{RT_m} \tag{8}$$

wherein $p_m$ is the intake manifold pressure, $T_m$ is the manifold air temperature, R is the gas constant of the gas mixture at the manifold intake, $V_d$ is the total cylinder volume displacement, $\eta_{eff}$ is a volumetric efficiency coefficient that relates the actual fresh air charge mass to the fresh air mass that could occupy the cylinder 46 if the entire displaced volume ($V_d$) were completely replaced with fresh air under manifold conditions. The value of the volumetric efficiency coefficient ($\eta_{eff}$) depends on the thermodynamic conditions during the ingestion process and on the valve timing and the lift profile.

The volumetric efficiency coefficient ($\eta_{eff}$) may be determined from a look-up table or from an analytical function based on physics.

A speed density equation that provides a basis for fuel metering calculations defines a mean-value cylinder flow ( $\dot{m}_{air_c}$) that may be derived from equation (9) as follows:

$$\dot{m}_{air_c} = \eta_{eff}\frac{p_m V_d}{RT_m}\frac{n}{2} \tag{9}$$

wherein n is the engine speed and $\dot{m}_{air_c}$ is the mass flow out of the manifold 36 and into the cylinder 46. The symbols $p_m$, and $T_m$ are the ambient and manifold pressures and temperatures, respectively, R is the specific gas constant and the isentropic exponent of air, $V_d$ the cylinder displacement volume, n the engine speed, and $\eta_{eff}$ is the volumetric efficiency of the engine. Pumping effects of a flow source on intake air mass flow, for example due to the engine and effecting the air mass flow at the intake manifold, may be approximated by the well known speed-density equation.

The engine and manifold pressure parameters are split into a known nominal part (superscript 0) and into an unknown correction part (prescript Δ). The nominal parts of the volumetric efficiency and of the throttle discharge coefficient are either calculated from static engine mapping data (look-up table approach) or via regression functions.

The dynamics of the manifold pressure are described according to methods known in the art using a non-minimum order model representation as follows:

$$\begin{aligned}\dot{\omega}_1 &= -(\eta_{eff}^0 + k_s)\kappa\frac{V_d}{V_m}\frac{n}{2}\omega_1 - \kappa\frac{V_d}{V_m}\frac{n}{2}p_m \\ \dot{\omega}_2 &= -(\eta_{eff}^0 + k_s)\kappa\frac{V_d}{V_m}\frac{n}{2}\omega_2 + \frac{R\kappa}{V_m}\dot{m}_{air_{th}}T_{th} \\ \hat{p}_m &= (k_s - \Delta\eta_{eff})\omega_1 + \omega_2\end{aligned} \tag{10}$$

The parameter $k_s$ is an arbitrary design parameter which is used to obtain desirable transient properties for the non-minimum order model The non-minimum representation model for the manifold pressure dynamics is used to design a state estimator according to the principles of an extended Kalman-filter for the unknown state $\hat{\theta}=k_s-\Delta\eta_{eff}$ based on the known inputs and outputs $\dot{m}_{air_{th}}$ and $p_m$, respectively, where $\dot{m}air_{th}$ is the mass air flow through the throttle 28 into the manifold 36. The Kalman-filter state estimator equations are given below:

Estimator extrapolation step:

$$\hat{\theta}_{k|k-1}=\hat{\theta}_{eff_{k-1}}$$

$$\Sigma_{k|k-1}=\Sigma_{k-1}+Q_k \tag{11}$$

Estimator update step:

$$\hat{\theta}_k=\hat{\theta}_{k|k-1}-K_k(p_{mk}-\hat{p}_{m_{k-1}})$$

$$K_k=\Sigma_{k|k-1}\omega_{1_k}[\omega_{1_k}\Sigma_{k|k-1}\omega_{1_k}+S_k]^{-1}$$

$$\Sigma_k=[I-K_k\omega_{1_k}]\Sigma_{k|k-1} \tag{12}$$

The symbol $\Sigma$ denotes the state covariance matrix, K the Kalman gain and Q and S are filter design parameters, respectively. While the filter design parameters Q and S signify in principle the state and the output noise covariance (and are hence determined by the statistical properties of the underlying process signals) they are typically chosen arbitrarily in such a way that desired filter performance is established. The Kalman filter provides an accurate estimate of the parameter $\theta$ provided that the throttle flow input is accurate. The volumetric efficiency correction $\Delta\eta_{eff}$ is calculated from the estimate $\theta$ as follows:

$$\Delta\eta_{eff}=k_s-\hat{\theta} \tag{13}$$

An estimate of the volumetric efficiency can be calculated from a nominal volumetric efficiency parameter $\eta_{eff}^0$ and the volumetric efficiency correction parameter $\Delta\eta_{eff}=k_s-\hat{\theta}$ as follows:

$$\hat{\eta}_{eff}=\eta_{eff}^0+\Delta\eta_{eff} \tag{14}$$

An estimate of the cylinder air charge (8) and of the cylinder air flow (9) can be calculated using the estimate for the volumetric efficiency as follows, respectively:

$$\hat{m}_{air_c}=\hat{\eta}_{eff}\frac{p_mV_d}{RT_m} \tag{15}$$

$$\hat{\dot{m}}_{air_c}=\hat{\eta}_{eff}\frac{p_mV_d}{RT_m}\frac{n}{2}$$

The air mass flow into the intake manifold 36 through the throttle orifice 86 ($\dot{m}_{air_{th}}$) may be expressed in terms of the compressible flow equation (16) as follows:

$$\dot{m}_{air_{th}}=A_{th}C_d\frac{p_a}{\sqrt{RT_a}}\psi\left\{\frac{p_m}{p_a}\right\} \tag{16}$$

wherein $A_{th}$ is the throttle orifice area, $C_d$ is the throttle discharge coefficient, $p_a$ and $T_a$ are the ambient pressure and temperature, respectively, and $\psi$ is the dimensionless compressible flow coefficient expressed as follows:

$$\psi=\sqrt{\frac{2\kappa}{\kappa-1}\left[\max\left(\frac{p_m}{p_a},\beta\right)^{\frac{2}{\kappa}}-\max\left(\frac{p_m}{p_a},\beta\right)^{\frac{\kappa+1}{\kappa}}\right]} \tag{17}$$

$$\beta=\left(\frac{2}{\kappa+1}\right)^{\frac{\kappa}{\kappa-1}}$$

wherein $\kappa$ is the isentropic coefficient for air.

Similar to the representation of the volumetric efficiency parameter, the throttle discharge coefficient ($C_d$) is represented in terms of a known nominal ($C_d^0$) and unknown portion ($\Delta C_d$) as defined in equation (18):

$$C_d=C_d^0+\Delta C_d \tag{18}$$

Substituting equation (18) into equation (16), the throttle air mass flow $\dot{m}_{air_{th}}$ may be expressed as specified in equation (19):

$$\dot{m}_{air_{th}}=A_{th}(C_d^0+\Delta C_d)\frac{p_a}{\sqrt{RT_a}}\psi\left\{\frac{p_m}{p_a}\right\} \tag{19}$$

With $\Delta\hat{C}_d$ as the estimate of $\Delta C_d$, a throttle mass flow estimate $\hat{\dot{m}}_{air_{th}}$ is derived from (19) as follows:

$$\hat{\dot{m}}_{air_{th}}=A_{th}(C_d^0+\Delta\hat{C}_d)\frac{p_a}{\sqrt{RT_a}}\psi\left\{\frac{p_m}{p_a}\right\} \tag{20}$$

Assuming that the nominal value of the throttle discharge coefficient is erroneous, an accurate estimate of the throttle mass flow may be obtained if the correction term $\Delta\hat{C}_d$ may be determined. To determine the correction term $\Delta C_d$, initially, the normalized air-fuel (A/F) ratio $\lambda$ is defined as follows:

$$\lambda=\frac{m_{air_c}}{F_{st}m_{f_c}} \tag{21}$$

The normalized A/F-ratio $\lambda$ is given as the ratio between the amount of cylinder air ($m_{air_c}$) and the amount of fuel ($m_{f_c}$) in the cylinder scaled by the fuel's stoichiometry factor ($F_{st}$).

The normalized A/F-ratio ($\lambda$) assumes a value of one under stoichiometric mixture conditions. The fuel is typically metered as a function of an estimate for the air charge ($\hat{m}_{air_c}$) and a fuel enrichment factor ($f_\lambda$) and may be expressed as follows:

$$m_{f_c}=\frac{1}{F_{st}}f_\lambda\hat{m}_{air_c} \tag{22}$$

Substituting (22) into (21) yields the normalized A/F-ratio ($\lambda$):

$$\lambda=\frac{m_{air_c}}{f_\lambda\hat{m}_{air_c}} \tag{23}$$

Assuming that the fuel enrichment factor ($f_\lambda$) is adjusted by existing closed-loop A/F ratio control algorithms such that the engine is running at a stoichiometric mixture ratio at all times, expression (23) may be expressed as:

$$f_\lambda=\frac{m_{air_c}}{\hat{m}_{air_c}}=\frac{\dot{m}_{air_c}}{\hat{\dot{m}}_{air_c}} \tag{24}$$

Thus, the fuel enrichment factor ($f_\lambda$) describes the ratio between the actual amount of air in the cylinder 46 (or the air flow into the cylinder 46) and an estimate of amount of air in the cylinder 46 (or the air flow into the cylinder 46). Hence, deviations of the enrichment factor ($f_\lambda$) from a value of one precisely characterizes the air flow (or air charge) estimation errors ($e_{m_{air}}$) defined by equation (25):

$$e_{m_{air}} = \dot{m}_{air_c} - \hat{\dot{m}}_{air_c} - (f_\lambda - 1)\hat{\dot{m}}_{air_c} \tag{25}$$

Under steady state conditions, the mass flow through the throttle orifice 86

$$(\hat{\dot{m}}_{air_{th}})$$

and the mass flow through the engine $$(\hat{\dot{m}}_{air_c})$$

are equivalent:

$$\hat{\dot{m}}_{air_{th}} = \hat{\dot{m}}_{air_c} \qquad \dot{m}_{air_{th}} = \dot{m}_{air_c} \tag{26}$$

Hence, substituting equation (26) into equation (25) yields:

$$e_{m_{air}} = \dot{m}_{air_{th}} - \hat{\dot{m}}_{air_{th}} - (f_\lambda - 1)\hat{\dot{m}}_{air_{th}} \tag{27}$$

Subtracting (20) from (19) leads to equation (28):

$$\dot{m}_{air_{th}} - \hat{\dot{m}}_{air_{th}} = (\Delta C_d - \Delta\hat{C}_d)A_{th}\frac{p_a}{\sqrt{RT_a}}\psi\left\{\frac{p_m}{p_a}\right\} \tag{28}$$

so that (27) finally becomes $$e_{m_{air}} = (f_2 - 1)\hat{\dot{m}}_{air_{th}} = (\Delta C_d - \Delta\hat{C}_d)A_{th}\frac{p_a}{\sqrt{RT_a}}\psi\left\{\frac{p_m}{p_a}\right\} \tag{29}$$

Thus, the air flow estimation error ($e_{m_{air}}$) is eliminated for arbitrary throttle and pressure conditions if the estimate of the discharge correction parameter $\Delta\hat{C}_d$ equals the actual value $\Delta C_d$. A discrete-time adaptation scheme for the unknown throttle air flow discharge parameter $\Delta\hat{C}_d$ is readily derived from equation (29) as follows:

$$d\Delta C_{dk} = k_{cd}e_{m_{air}} = k_{cd}(f_\lambda(t_k) - 1)\hat{\dot{m}}_{air_{th}}(t_k) \qquad \Delta\hat{C}_{dk} = \Delta\hat{C}_{dk-1} + d\Delta C_{dk} \tag{30}$$

A more sophisticated adaptation policy involving an adjustable gain is not favored for two reasons: 1) With the assumptions and modeling errors associated with equation (30) together with a need to separate the adaptation rates of the volumetric efficiency correction and the discharge correction, only a very low adaptation bandwidth would function well, and 2) since the discharge error $\Delta C_d$ is probably not constant but a function of both the throttle position $\alpha_{th}$ and the throttle pressure drop $r_p$, the adaptation is implemented in the form of a block learn scheme.

A block learn table for throttle discharge correction 100 is defined according to FIG. 5. Per the nomenclature introduced in FIG. 5 and the adaptation scheme incorporated in equation (30), the update of the block-learn table evolves as follows:

1) Calculate the incremental correction for the current operating point according to equation (31):

$$d\Delta\hat{C}_{dk} = k_{cd}(f_\lambda(t_k) - 1)\hat{\dot{m}}_{air_{th}}(t_k) \tag{31}$$

2) Identify the four grid points that surround the current operating point and calculate weighting factors for each grid point as follows:

$$f_i = \frac{r_p - r_{pi}}{r_{pi+1} - r_{pi}},\; f_j = \frac{\alpha_{th} - \alpha_{th\,j}}{\alpha_{th\,j+1} - \alpha_{th\,j}} \qquad g_{i,j} = (1 - f_i)(1 - f_i), \quad g_{i+1,j} = f_i(1 - f_i), \quad g_{i,j+1} = (1 - f_i)f_i, \quad g_{i+1,j+1} = f_i f_j \tag{32}$$

wherein $\alpha_{th}$ is the angle of the throttle plate 32, $r_p$ is the ratio of manifold pressure to ambient pressure.

3) Update the table value in each of the four current grid-points according to $$\Delta\hat{C}_{dk_{(m,n)}} = \Delta\hat{C}_{dk\text{-}1_{(m,n)}} + g_{(m,n)}d\Delta C_{dk1}\,\forall m \in [i,i+1], n \in [j,j+1] \tag{33}$$

In the absence of a mass flow sensor, accuracy of this signal is established gradually by using an adaptive scheme for the unknown discharge correction as follows:

$$\Delta\hat{C}_{dk} = \Delta\hat{C}_{d_{k-1}} + k_{cd}(f_{\lambda\,k} - 1)\hat{\dot{m}}_{air_{thk}} \tag{34}$$

Here the symbol $f_\lambda$ stands for the closed-loop fuel correction factor and $k_{cd}$ is the adaptation gain. This gain is a discretionary parameter and is selected to be small enough to establish stable adaptation and yet large enough to achieve a sensible adaptation response time. Because the adaptation bandwidth is rather small, the update law described in equation (3) is used along with a look-up table 100 for the discharge correction. The use of look-up tables accounts for the fact that the discharge error is typically not constant across the entire engine operating envelope but rather a function of the throttle position and of the pressure conditions across the throttle orifice 86. The look-up table is updated in the four neighboring grid-points of the actual operating point (in terms of throttle position $\alpha_{th}$ and pressure ratio $\pi_{th}$ across the throttle plate 32). Hence, $$\Delta\hat{C}_{dk_{m.n}} = \Delta\hat{C}_{dk-1\,m.n} + g_{m.n}\cdot k_{cd}(f_{\lambda k} - 1)\hat{\dot{m}}_{air_{th_k}} \;\vee m \in [i, i+1], \; n \in [j, j+1] \tag{35}$$

The indices i and j denote the ith grid point on the throttle position axis and the jth grid point on the pressure ratio axis, respectively. The parameter $g_{m,n}$ is a weighting factor associated with the update of the grid point with indices (m, n) that accounts for the distance of the actual operating point from that particular grid point (the weighting factors of all four grid points add up to a sum of one).

The continuously updated look-up table is then used to calculate the discharge correction term $\Delta C_d$ applied in (19). With the notation introduced above, the mathematical formalism to describe this step is given as follows:

$$\Delta\hat{C}_{dk} = \sum_{m=1}^{i+1}\sum_{n=j}^{j+1} g_{m,n}\Delta\hat{C}_{d_{m,n}} \tag{36}$$

For the slow adaptation loop 92 of throttle flow model 80, active closed-loop fuel control, precise knowledge of the stoichiometric factor $F_{st}$, and accurate fuel metering are assumed. In cases when these assumptions are not true, the throttle flow adaptation loop 92 needs to be disabled by turning off switch $SW_{CD}$ 88 in FIG. 2. Examples of these circumstances include, but are not limited to, a fuel property change as detected by a refuel event, a fuel injector fault as detected by fuel injector diagnostics, and an oxygen sensor fault as detected by emission diagnostics.

During the time when the throttle model adaptation is disabled, the $F_{st}$ value is based on existing fuel type detection algorithms. Meanwhile, the throttle flow model 80 uses the nominal value of the discharge coefficient $C_D$.

The correction of the discharge coefficient constitutes the second adaptation loop 92.

Under high load conditions when the pressure ratio across the throttle plate approaches a value of one the compressible flow equation becomes increasingly inappropriate to characterize the mass flow through the throttle orifice. For this purpose the calculation of the throttle flow equation (20) is modified for high load conditions as follows:

$$\hat{\dot{m}}_{air_{th_{PL}}} = A_{th}\left(C_d^0 + \Delta\hat{C}_d\right)\frac{p_a}{\sqrt{RT_a}}\left\{\frac{p_m}{p_a}\right\} \tag{37}$$

$$\hat{\dot{m}}_{air_{th_{FL}}} = \left(1 + \Delta\hat{C}_d\right)\eta_{eff}^0\frac{p_m V_d}{RT_m}\frac{n}{2}$$

$$\hat{\dot{m}}_{air_{th}} = \begin{cases} \hat{\dot{m}}_{air_{th_{PL}}} & \text{if } \frac{p_m}{p_u} \le p_{r_{FL}} \\ k_{arb}\cdot\hat{\dot{m}}_{air_{th_{PL}}} + (1-k_{arb})\cdot\hat{\dot{m}}_{air_{th_{FL}}} & \text{if } \frac{p_m}{p_a} > p_{r_{FL}} \end{cases}$$

More particularly, when the pressure ratio exceeds a certain threshold $p_{r_{FL}}$ the throttle mass flow is calculated as the weighted average of a mass flow value $\dot{m}_{air_{thPL}}$, which is based on a compressible flow equation approach and a mass flow value $\dot{m}_{air_{thFL}}$. The mass flow value $\dot{m}_{air_{thFL}}$ is based on a speed-density equation approach. The arbitration factor $k_{arb} \in [0\ 1]$ is a calibration parameter and is implemented in terms of a lookup table with respect to pressure ratio. The calculation of the discharge correction estimate $\Delta\hat{C}$ is independent of the load case and remains as described in equation (36). Similarly, the update of the discharge error lookup table is independent of the load case and remains as described in equation (35).

The invention has been described with specific reference to the exemplary embodiments and modifications thereto. Further modifications and alterations may occur to others upon reading and understanding the specification. It is intended to include all such modifications and alterations insofar as they come within the scope of the invention.

The invention claimed is:

1. Method of estimating an air charge in at least one combustion cylinder of an internal combustion engine including a controller in signal communication with the engine and with a fuel delivery system, a combustion cylinder and piston reciprocating therein, an intake manifold directing flow of air into the at least one combustion cylinder, and an air throttle having a throttle orifice directing flow of air mass into the intake manifold, wherein the engine has cam-phasing and variable valve lift capability, the method comprising:

calculating cylinder mass air flow based upon a volumetric efficiency parameter;

calculating the intake throttle mass air flow based upon a throttle air flow discharge parameter and a fuel enrichment factor;

using a first cylinder air mass flow adaptation loop to update the volumetric efficiency parameter;

using a second throttle mass flow adaptation loop to update the throttle air flow discharge parameter; and using each of the first cylinder air mass flow adaptation loops and the second throttle mass flow adaptation loop to estimate the air charge within the at least one combustion cylinder.

2. Method of estimating an air charge in at least one combustion cylinder of an internal combustion engine including a controller in signal communication with the engine and with a fuel delivery system, a combustion cylinder and piston reciprocating therein, an intake manifold directing flow of air into the at least one combustion cylinder, and an air throttle having a throttle orifice directing flow of air mass into the intake manifold, the method comprising:

calculating cylinder mass air flow based upon a volumetric efficiency parameter;

calculating the intake throttle mass air flow based upon a throttle air flow discharge parameter and a fuel enrichment factor; and using the cylinder mass air flow and throttle mass air flow to estimate the air charge within the at least one combustion cylinder.

3. The method of claim 2, wherein the internal combustion engine comprises a naturally aspirated or a boosted internal combustion engine.

4. The method of claim 2, further comprising:

using a first adaptation loop to correct the volumetric efficiency parameter; and using a second adaptation loop to correct the throttle air flow discharge parameter.

5. The method of claim 4, further comprising:

disabling the second adaptation loop when a stoichiometric fuel enrichment factor and accurate fuel metering are not known.

6. The method of claim 2, further comprising:

using a set of engine measurement parameters input into a mean-value cylinder flow model to calculate a nominal volumetric efficiency parameter.

7. The method of claim 6, further comprising:

using a manifold dynamic model to estimate a manifold pressure;

comparing a measured manifold pressure with the estimated manifold pressure to determine a manifold pressure error metric; and updating the nominal volumetric efficiency parameter with a corrected volumetric efficiency parameter using the manifold pressure error metric.

8. The method of claim 7, further comprising:
correcting the volumetric efficiency parameter using the manifold pressure error metric; and
inputting the corrected volumetric efficiency parameter into the mean-value cylinder flow model.

9. The method of claim 8, further comprising:
determining a mean-value cylinder flow, wherein the mean-value cylinder flow is an average mass air flow rate out of the intake manifold into each combustion cylinder within the internal combustion engine.

10. The method of claim 9, further comprising:
using a speed density calculation to determine the mean-value cylinder flow.

11. The method of claim 9, further comprising:
using the mean-value cylinder air flow and the intake throttle mass air flow to determine the manifold pressure error metric.

12. The method of claim 2, further comprising:
inputting throttle position measurements into a throttle flow model;
calculating a nominal throttle air flow discharge parameter associated with the throttle flow model;
deriving an air flow estimation error metric from a stoichiometric offset of a closed-loop fuel enrichment factor; and
updating the nominal throttle air flow discharge parameter with a corrected throttle air flow discharge parameter based on the air flow estimation error metric.

13. The method of claim 12, further comprising:
using a block look-up table to determine the corrected throttle air flow discharge correction parameter.

14. The method of claim 13, wherein the corrected throttle air flow discharge parameter is a function of the air intake throttle position and of pressure across the throttle orifice.

15. The method of claim 12, further comprising:
estimating air flow through the throttle orifice; and
adjusting the air flow through the throttle orifice in accordance with the corrected throttle air flow discharge parameter.

16. The method of claim 15, further comprising:
correcting the throttle air flow discharge parameter using a normalized air-fuel ratio, wherein the normalized air-fuel ratio is the ratio of an amount of combustion cylinder air and an amount of fuel in the at least one combustion cylinder scaled by a stoichiometric fuel enrichment factor associated with the fuel.

17. The method of claim 16, further comprising:
determining a fuel enrichment factor, wherein the fuel enrichment factor is a ratio of an actual amount of air in the combustion cylinder and an estimate of an amount of air in the combustion cylinder.

18. The method of claim 17, further comprising:
determining the air flow estimation error metric of the fuel enrichment factor when the fuel enrichment factor does not equal a value of 1.

19. The method of claim 18, further comprising:
eliminating the air flow estimation error when an estimated throttle air flow discharge parameter equals an actual value of the throttle air flow discharge parameter.

* * * * *